United States Patent
Cunningham Thomson et al.

(10) Patent No.: US 6,544,697 B2
(45) Date of Patent: Apr. 8, 2003

(54) MOULDABLE PHOTOGRAPHIC MATERIAL

(75) Inventors: Andrew Cunningham Thomson, Mayford (GB); Penelope Anne Thomson, Mayford (GB)

(73) Assignee: Digiplast N.V., Antwerp (BE)

( * ) Notice: Subject to any disclaimer, the term of this patent is extended or adjusted under 35 U.S.C. 154(b) by 0 days.

(21) Appl. No.: 09/355,920
(22) PCT Filed: Feb. 10, 1998
(86) PCT No.: PCT/GB98/00410
§ 371 (c)(1), (2), (4) Date: Oct. 21, 1999
(87) PCT Pub. No.: WO98/35269
PCT Pub. Date: Aug. 13, 1998

(65) Prior Publication Data
US 2002/0122996 A1 Sep. 5, 2002

(30) Foreign Application Priority Data
Feb. 10, 1997 (GB) ................................................ 9702669

(51) Int. Cl.⁷ ............................ G03C 11/08; G03C 11/00
(52) U.S. Cl. .................... 430/14; 264/101; 264/241; 40/800; 283/77; 283/112; 156/90; 156/196; 156/242; 156/245
(58) Field of Search ....................... 430/14; 264/101, 264/241; 40/800; 283/77, 112; 156/90, 196, 242, 245

(56) References Cited

U.S. PATENT DOCUMENTS

| | | | | |
|---|---|---|---|---|
| 2,090,016 A | | 8/1937 | Young et al. ................... 95/8 |
| 3,856,592 A | * | 12/1974 | Giorgi .......................... 156/59 |
| 3,871,119 A | | 3/1975 | Mayer ........................... 40/2.2 |
| 4,093,489 A | * | 6/1978 | Hong ............................ 156/245 |
| 4,370,397 A | | 1/1983 | Ceintrey et al. ............... 430/10 |
| 4,378,392 A | | 3/1983 | Segel ............................. 428/40 |
| 4,455,359 A | | 6/1984 | Pätzold et al. ................. 430/10 |
| 4,456,667 A | | 6/1984 | Bochow et al. ................ 430/10 |
| 4,648,188 A | * | 3/1987 | Blair ............................ 40/538 |
| 5,894,048 A | * | 4/1999 | Eckart et al. ................. 428/339 |

FOREIGN PATENT DOCUMENTS

| | | |
|---|---|---|
| DE | 42 18 158 | 12/1993 |
| EP | 0 018 887 | 11/1980 |
| EP | 0 250 657 | 1/1988 |
| EP | 0 348 310 | 12/1989 |
| EP | 0 351 456 | 1/1990 |
| FR | 2 145 135 | 2/1973 |
| GB | 739477 | * 10/1955 |
| GB | 1061961 | 3/1967 |
| GB | 2 121 812 | 1/1984 |

* cited by examiner

Primary Examiner—John A. McPherson
(74) Attorney, Agent, or Firm—Jacobson Holman PLLC

(57) ABSTRACT

A mouldable photographic material is made up from a thermoplastic base sheet, and a primer coating which provides the key for a photographic emulsion layer. Following exposure and development, a thermoplastic foil is laid over the emulsion layer and bonded in place using an optical quality adhesive.

12 Claims, 1 Drawing Sheet

MOULDABLE PHOTOGRAPHIC MATERIAL

Figure 1:
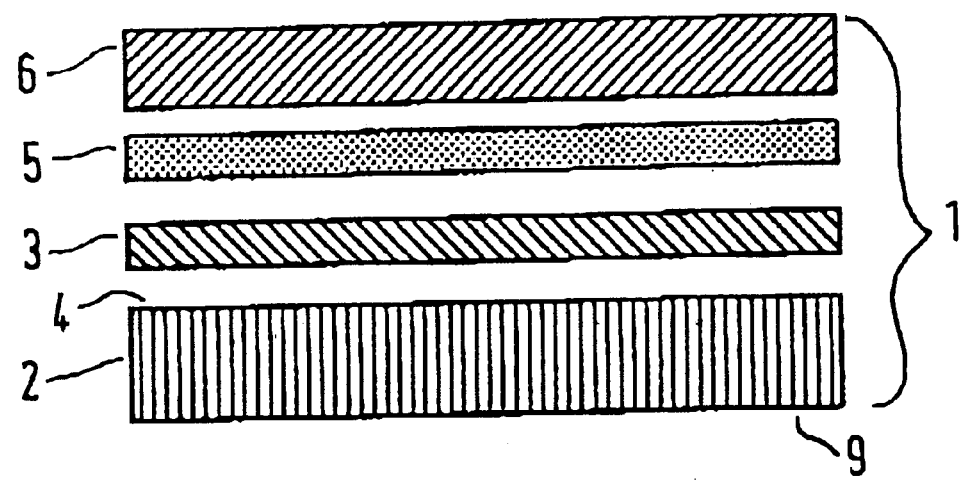
Figure 1:
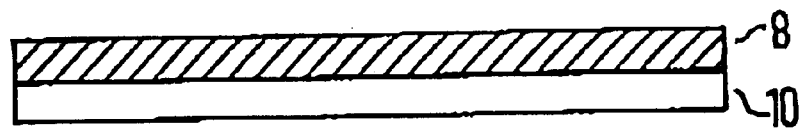
Figure 1:

The present invention relates to a mouldable photographic material and a method of forming same, particularly, although not exclusively for decorative use.

Conventional photographic material lacks stability when subjected to heat. Consequently, such material is unsuitable for use in moulding processes and other environments where it might be subject to thermal and other forms of environmental stress. The desirability of a photographic material which is capable of being formed into for example the trim components of a vehicle or the housing of a consumer electrical item is clear. Consequently, there have been many attempts to obtain a suitable mouldable photographic material. An early example of such an attempt is shown in French Patent No. 968.638 which relates to a method for the preparation of photographic surface for moulding and also U.K. Patent No. 739,477 relating to photographic silver halide films. However, none of the attempted solutions to date has achieved a satisfactory solution free from defects in appearance particularly cracking of the image and heat induced distortion.

It is therefore an object of the present invention to provide a photographic material and method for producing same which material is capable of being moulded under conditions of heat and/or pressure without suffering the degradation in quality and finish shown exhibited by the prior art. It is a further object of the present invention to provide such a material which may be produced without the need for specialised equipment.

According to the present invention, there is provided a method of forming a three-dimensional photographic material article, comprising the steps of coating a thermoplastic base with, in order, a primer layer, and a light sensitive layer and then, following exposure, developing, and drying steps bonding a protective thermoplastic foil to the exposed and developed light sensitive layer prior to moulding the material.

Whilst the material may be provided for subsequent processing in individual sheet form advantageously the material could be prepared in roll form thereby enabling the product to be used in a continuous production process.

The thermoplastic base is preferably formed from a PVC material although a polycarbonate can be equally effective particularly where the physical characteristics of polycarbonate provide advantages in terms of the final moulded product. Alternatively, acrylonitrile butadiene styrene (ABS) may be used as the base, either on its own or with a polyvinylchloride (PVC). In any case, the material is preferably pigmented to form an opaque white which ensures accurate rendition of colour in the exposed light sensitive layer. The thermoplastic foil may be formed of any suitable material exhibiting the desired physical properties, e.g. scratch resistance. Accordingly, polyester and polycarbonate foils have been found to be particularly effective.

Where a PVC material is used as the base, an additional compound to prevent plasticiser migration may be included in the primer layer or, indeed applied as a separate layer. Similarly, a compound to prevent water migration may be included where the base is a polycarbonate material. Further adhesive layers and the like may be added to both sides of the material, i.e. the uncoated side of the base and the protective foil depending on the particular application of the material.

Figure 2:
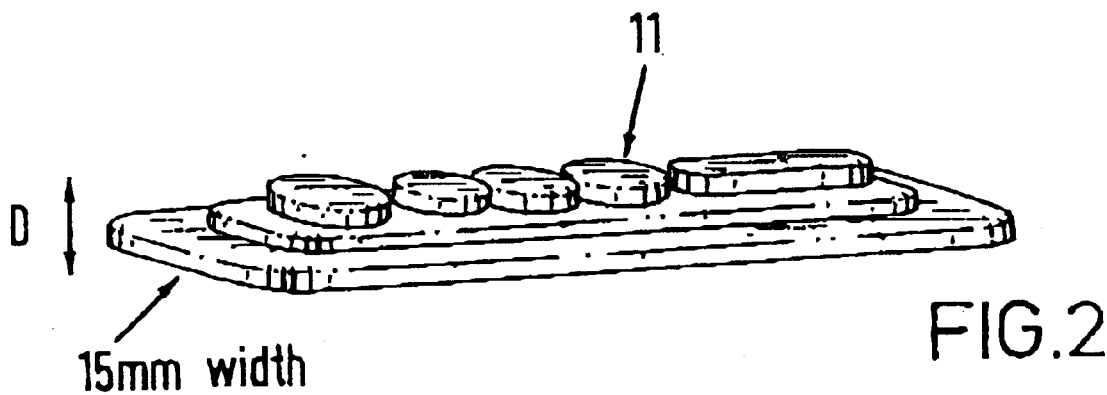

In order to aid in understanding the invention a specific embodiment thereof will now be described by way of example and with reference to the accompanying drawings, in which:

FIG. 1 is a diagrammatic cross-sectional side view of a mouldable photographic material according to the invention shown together with a part; and FIG. 2 is a perspective view of a vacuum formed article of the material of FIG. 1.

Referring to the sole Figure, the material 1 includes a thermoplastic support or base sheet 2 of pure white colour and 200 micron thickness. After extensive tests the most suitable PVC material for the sheet has the following formulation:

| | | |
|---|---|---|
| PVC polymer | 100 | (polymer) |
| Di-iso-decyl Phthalate | 14 | (plasticiser) |
| Octyl Epoxy Stearate | 3 | (co-stabiliser) |
| Barium Zinc Stabiliser | 3 | (stabiliser) |
| Titanium Dioxide | 16.5 | (pigment) |
| Ultramarine Blue | 0.1 | (pigment) |
| Ultramarine Violet | 0.04 | (pigment) |
| Carbon black dispersion | 0.14 | (pigment) | in which the level of residual VCM monomer is less than 10 ppm and perhaps as low as 2 ppm.

Using conventional pass through machinery, a primer coating 3 is then applied to a display side 4 of the base 2, the coating 3 is formulated to provide a keying surface for a photographic emulsion layer 5. The coating 3 may optionally include a compound to prevent plasticiser migration from the base 2.

Once the photographic emulsion layer 5, which may be of conventional type, e.g. Agfa Type 10, has been applied, the resulting sandwich comprising the base 2, coating 3 and layer 5 is, of course, sensitive to light. Accordingly, the unexposed sandwich must be carefully handled prior to an exposure step in which an image is formed, suitably a wood-grain, although any other required image may be formed. The exposed sandwich is then developed using conventional machinery and dried. A protective layer of thermoplastic material, in this case a polyester foil or sheet material 6 is then laid over the display side 4 or the sandwich to provide scratch-resistance for the photographic layer 5 and/or improve the resistance of the material 1 to UV-light induced degradation.

One particularly suitable protective material is the 200 micron thickness PET-foil produced by AUTOTEX under designation V200 UV. An adhesive suitable for securing such a material to the sandwich must by clean and colourless on drying in order not to be detrimental to the optical quality of the image. One such adhesive has been found to be that produced by National Starch and Chemical Limited under product code 380-1846, having the following specification.

| | |
|---|---|
| Appearance: | clear water white solution |
| Solids: | 29–31% |
| Viscosity (Brookfield): | 250–350 cps |
| Flash Point: | −4° C. |
| Diluent: | Ethyl acetate |
| Solvent Blend: | Hepatane 22, Toluene 57, Isopropanol 18, Ethyl Acetate 3 |

Depending on the final end use of the material 1, further optional layers may be applied. Thus where the material is destined to be bonded to a separate part 7, an adhesive layer 8 may by applied to the non-display side 9 of the base 2 and protected until application to the part 7 by a release film 10.

However, where a PVC base 2 is used, an adhesive may not be necessary as conventional heat rolling should be sufficient to bond the material 1 to the part.

It will be noted that there is no requirement for balancing layers or coatings to be applied on the non-display side of the base. In particular, there is no requirement for a non-curl layer. It will also be recognised that important benefits are attached to this feature, namely the reduction in cost through reduced material requirements and perhaps more importantly, the reduction of the number of machinery passes required.

Whilst the above example refers to a PVC base which provides an extremely wear resistant product, the product and process can equally be formed on a polycarbonate base. A polycarbonate based material is particularly suitable for moulding complete items e.g. casings for televisions, monitors, (laptop) computers, and the like where the extremely good impact strength and rigidity exhibited by the material are desirable.

It has been found that the above product in both PVC and polycarbonate form is capable of being formed into complex shapes using conventional moulding processes without degradation and that furthermore over extended periods the material remains resistant to fading and is stable at the elevated temperatures found within the interior of a motor vehicle, for example. In tests, a sample of the above described PVC base product was formed into a three dimensional article under laboratory conditions. The finished article 11 was found to be without visible cracking, break up or other distortions. The sample was vacuum formed for up to 1.2 minutes at around 180°. As is shown in FIG. 2, the article 11 had a depth of 20 mm formed in a relatively small sample of only 15 cm in width.

Applications for the above described material are, as will be recognised by those skilled in the art, numerous. Uses include the production of pop-up display stands where great savings in cost and durability can be achieved over existing techniques. In addition, a food safe material can be produced by using a food grade PVC base.

What is claimed is:

1. A method of forming a photographic material article having a molded complex three-dimensional shape, comprising the following sequential steps:
    a) coating a thermoplastic base sheet with a primer layer,
    b) applying to the primer layer a multi-layer light sensitive color photographic emulsion,
    c) exposing, developing and drying the light sensitive photographic emulsion layers,
    d) bonding a protective thermoplastic foil to the exposed, developed and dried photographic layers, and
    e) molding the product of step (d) to a complex three-dimensional shape at an elevated temperature.

2. A method according to claim 1, which comprises adhesively bonding the protective foil to the exposed and developed light sensitive layer.

3. A method according to claim 1, wherein the molding is effected by vacuum forming.

4. A method according to claim 3, wherein the vacuum forming is effected at a temperature of 180° C. for up to 1.2 minutes.

5. A molded three-dimensional photographic material article which is the same as that obtained by a method of claim 1.

6. A photographic material that is moldable to a complex three-dimensional shape under application of heat and comprising the following components:
    i) a thermoplastic base sheet,
    ii) a primer layer providing a key for a light sensitive layer,
    iii) a multi-layer light sensitive color photographic emulsion, which is exposed, developed and dried in situ and which is part of a unitary structure with components (i) and (ii), and
    iv) a protective thermoplastic foil bonded with an optical quality adhesive to the exposed, developed and dried photographic layer.

7. A material as claimed in claim 6, wherein the base sheet is pigmented opaque white to ensure accurate rendition of color in component (iii).

8. A material as claimed in claim 7, wherein the base sheet is PVC.

9. A material as claimed in claim 8, wherein the primer layer includes a compound which prevents plasticizer migration.

10. A material as claimed in claim 6, wherein the base sheet is a polycarbonate.

11. A material as claimed in claim 6, wherein the base sheet and/or the protective thermoplastic foil is an acrylonitrile butadiene styrene polymer.

12. A material according to claim 6, wherein the protective thermoplastic foil is a polycarbonate.

\* \* \* \* \*